United States Patent

Feistel

[11] Patent Number: 6,045,135
[45] Date of Patent: Apr. 4, 2000

[54] SEALING RING DISK

[75] Inventor: Norbert Feistel, Winterthur, Switzerland

[73] Assignee: Maschinenfabrik Sulzer-Burkhardt AG, Basel, Switzerland

[21] Appl. No.: 08/981,164

[22] PCT Filed: Jun. 4, 1996

[86] PCT No.: PCT/CH96/00213

§ 371 Date: Dec. 11, 1997

§ 102(e) Date: Dec. 11, 1997

[87] PCT Pub. No.: WO97/00394

PCT Pub. Date: Jan. 3, 1997

[30] Foreign Application Priority Data

Jun. 14, 1995 [EP] European Pat. Off. .............. 95810399

[51] Int. Cl.[7] ........................................................ F16J 9/16
[52] U.S. Cl. ........................... 277/434; 277/489; 277/490; 277/946
[58] Field of Search ................................. 277/435, 946, 277/446, 447, 448, 489, 490, 491

[56] References Cited

U.S. PATENT DOCUMENTS

| 1,371,066 | 3/1921 | Bessinger | 277/490 |
|---|---|---|---|
| 1,413,409 | 4/1922 | Lackman | 277/489 |
| 1,476,657 | 12/1923 | Tawney | 277/489 |
| 1,749,832 | 3/1930 | Morton | 277/446 |
| 1,822,101 | 9/1931 | Lewis | 277/491 |
| 1,970,892 | 8/1934 | Kirn et al. | 277/489 |
| 2,386,117 | 10/1945 | Hvid | 277/489 |
| 2,843,434 | 7/1958 | Orloff et al. | 277/491 |
| 2,910,332 | 10/1959 | Madsen | 277/491 |

FOREIGN PATENT DOCUMENTS

| 1.249.037 | 11/1960 | France . | |
|---|---|---|---|
| 19367 | 9/1882 | Germany . | |
| 641 578 | 2/1937 | Germany . | |
| 26 44 119 | 4/1978 | Germany . | |
| 16452 | of 1902 | United Kingdom | 277/491 |

*Primary Examiner*—Anthony Knight
*Assistant Examiner*—Alison K. Pickard
*Attorney, Agent, or Firm*—Townsend and Townsend and Crew LLP

[57] ABSTRACT

A sealing ring disk for a seal at a piston rod with a circular cross-section. The sealing ring disk includes a ring-shaped seal part with a sector-like cut-out as well as a closure part having a main part matched to the cut-out in such a manner that the main part extending in the peripheral direction of the seal part can be inserted into the cut-out in order to assemble the two parts into a single sealing ring disk.

12 Claims, 6 Drawing Sheets

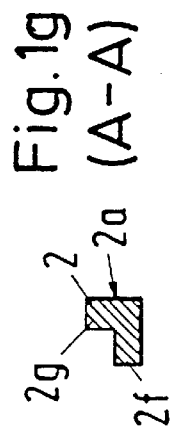
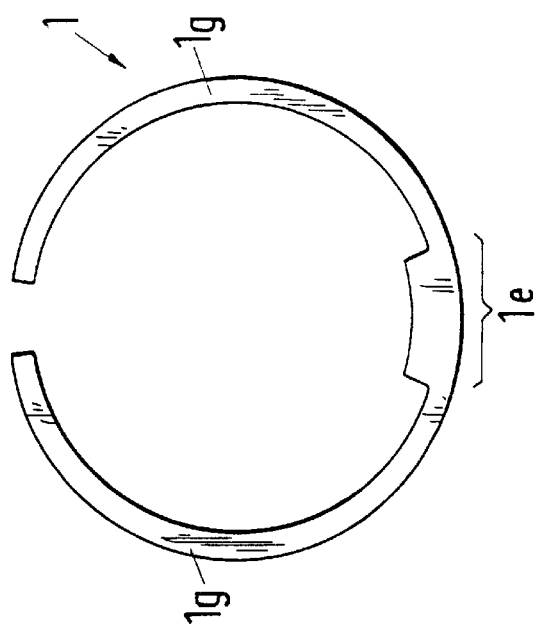
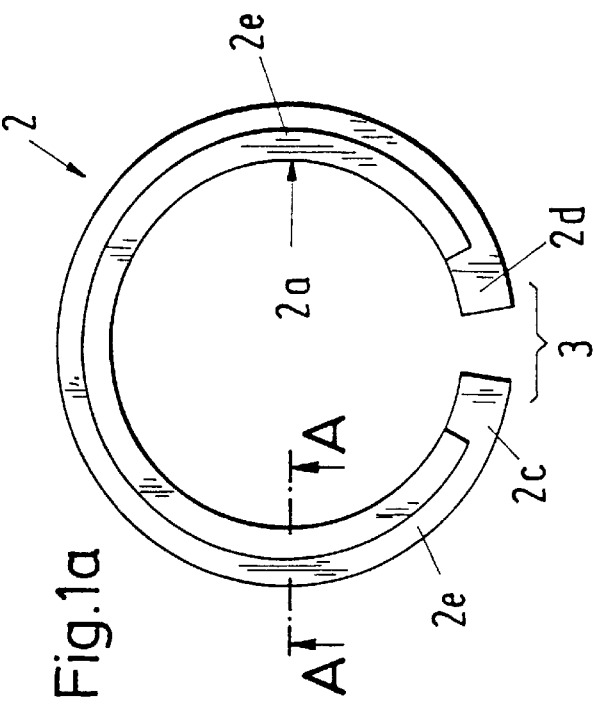
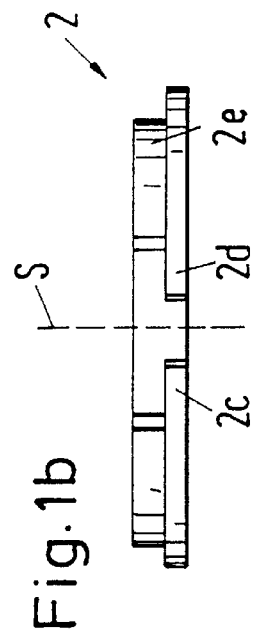

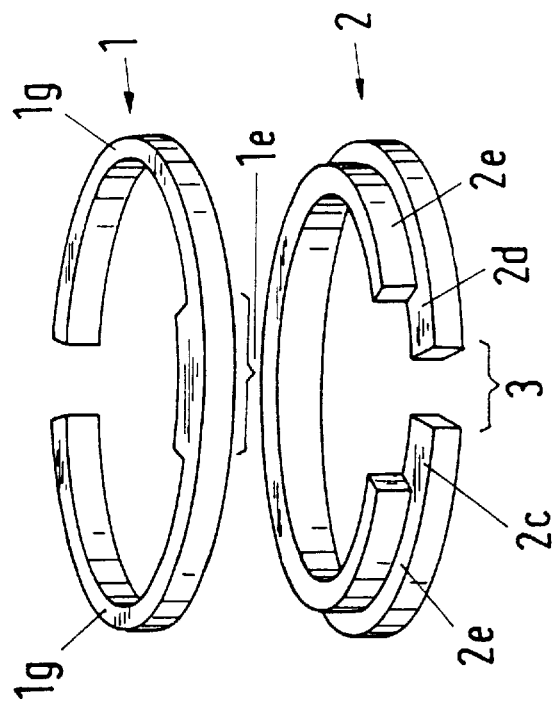
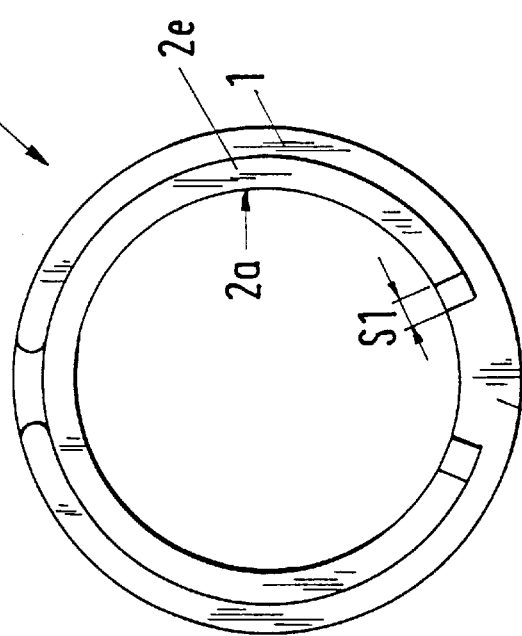
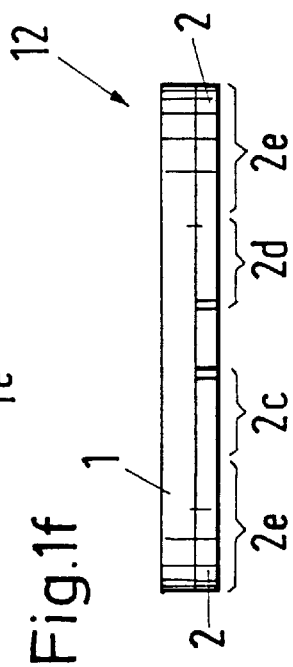

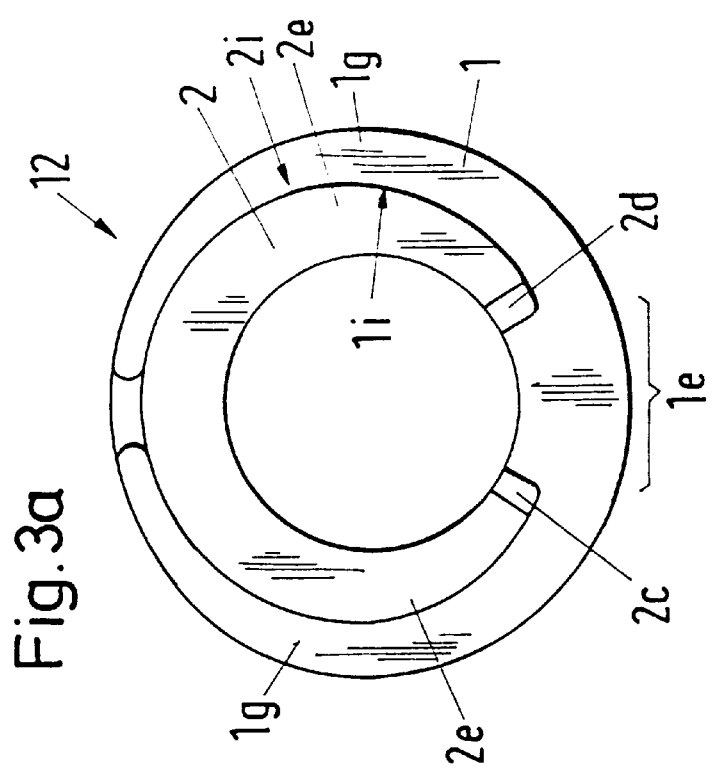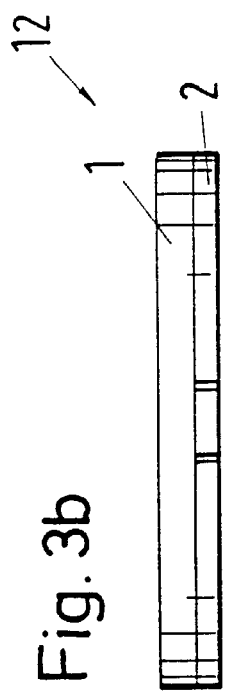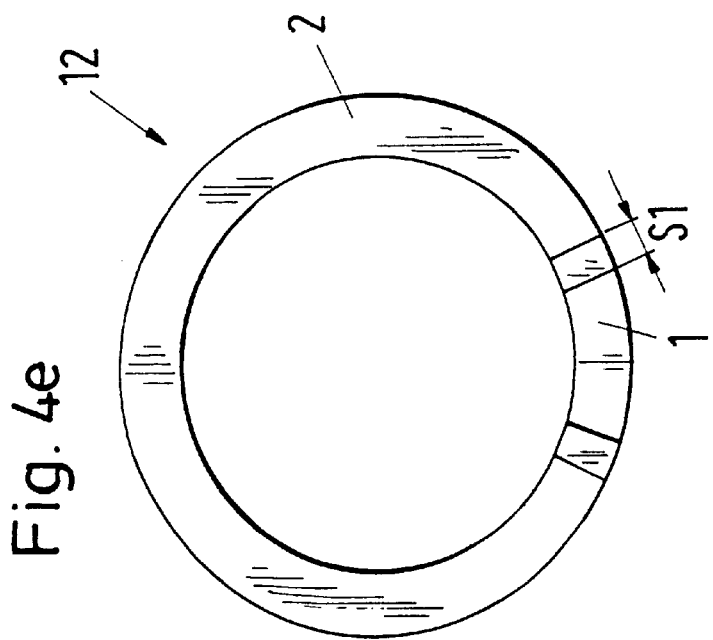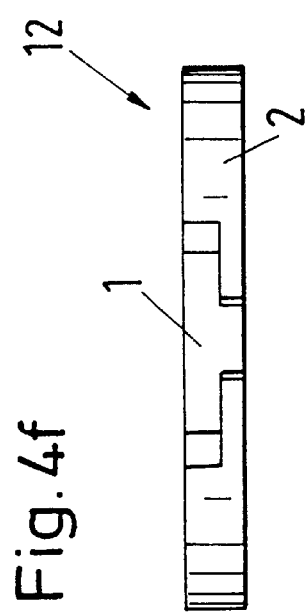

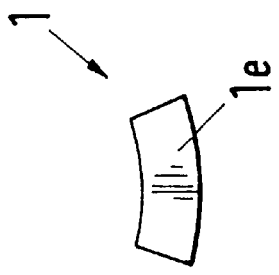
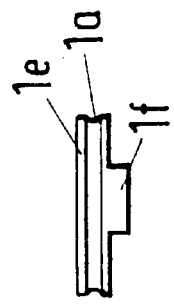
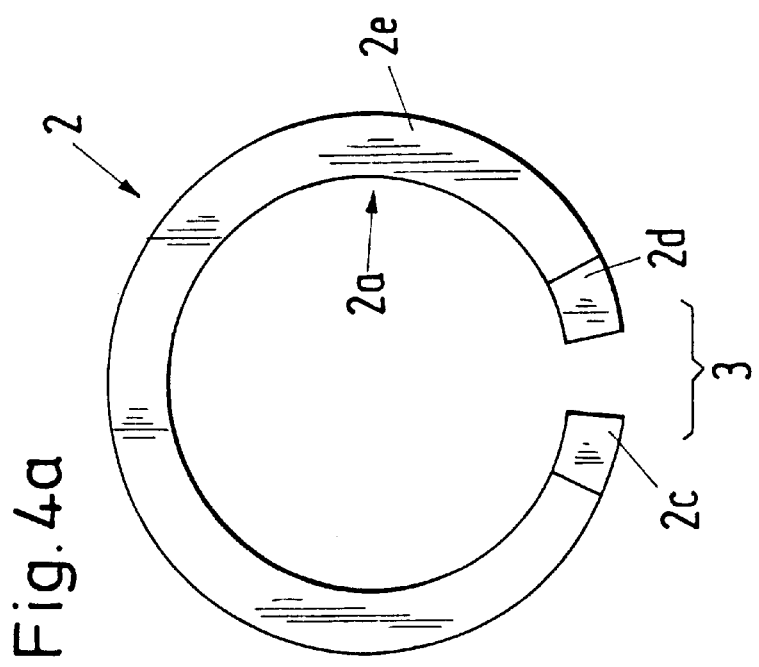
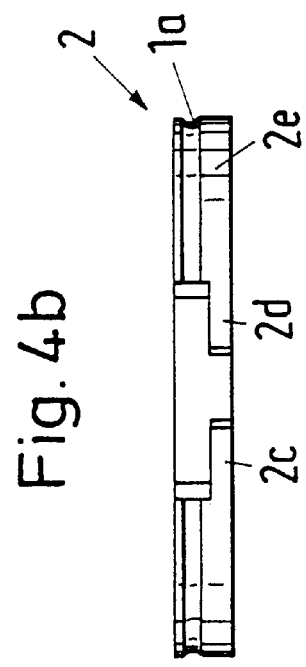

SEALING RING DISK

BACKGROUND OF THE INVENTION

1. Field of the Invention

The invention relates to a sealing ring disk for a seal at a piston rod.

2. Description of the Prior Art

Dry running piston compressors are machines which require no foreign lubrication in the compression part. Such compressors have fixed sealing elements past which a piston rod is moved. With such an arrangement, a plurality of seal elements are usually arranged pair-wise one after the other in series forming a so-called packing. A pair of seal elements arranged in a packing in this manner is known from DE-42 01 246 C2. This arrangement and design of seal elements has the disadvantage that in each case two seal elements are to be placed lying adjacent to one another in the direction of motion of the piston in order to fulfil the seal function. A known problem of such seals at piston rods is the arising heat of friction. Conveying off the heat of friction via the seal elements themselves is possible only to a limited extent, since the seal elements are usually made of plastic and act thermally nearly as insulators. The greatest portion of the heat of friction is thus led off in a clearly less efficient manner by the piston rod. The arising heat of friction is thus largely responsible for a high degree of wear. Thus, a complicated and expensive cooling of the packing containing the sealing elements is often required.

The object of the present invention is to overcome these known disadvantages of sealing elements.

SUMMARY OF THE INVENTION

The sealing ring disk in accordance with the invention is suitable, in particular, for dry running ring piston compressors, with the sealing ring disks consisting of a plastic with self-lubricating properties. Such sealing ring disks are used e.g. as piston rod seals (stuffing box, packing) in which the piston rod is moved past the fixed seal elements. As a result of the low heat resistance of polymer sealing materials the heat of friction which arises can lead to substantial thermal problems. An advantage of the sealing ring disk in accordance with the invention is to be seen in the fact that the sealing ring disk can be made relatively thin in the direction of the piston rod; and, in comparison with the cited state of the art, a single sealing ring disk suffices to ensure the seal function instead of the two sealing rings as previously. The relatively thin sealing ring disk in accordance with the invention has the advantage that an increased heat flow is possible through radiation from the piston rod to the metal housing of the packing, since the sealing ring disk that acts as an insulator has smaller dimensions, and that the ratio of the portion of the piston rod surface not covered over by seal rings to the sum of the seal ring contact area is substantially more favorable. A further advantage of the sealing ring disk of the invention is to be seen in the fact that the radial partition joints known from the current state of the art can be dispensed with. For this reason it is no longer necessary to use two sealing ring disks lying adjacent to one another, but rather the use of a single sealing ring disk suffices. Suitable materials for the sealing ring disk are plastics for dry running applications such as filled polymers with a matrix of polytetrafluoroethylene (PTFE) or a mixture of mechanically solid, high-temperature-resistant and wear-resistant modified polymers such as polyetheretherketone (PEEK), polyetherketone (PEK) polyimide (PI), polyphenylene sulphide (PPS), polybenzimidazole (PBI), polyamidimide (PAI) or even epoxy resin.

The sealing ring disk in accordance with the invention can be manufactured of modified PEEK. This has the advantage that very thin rings can be manufactured so that, on the one hand, the piston rod can better transmit the heat via radiation to the packing and, on the other hand, a smaller frictional area exists between the seal ring and the piston rod, which also reduces the heating. Too much heating up of the piston rod can be avoided in this manner, which has the advantage that the sealing ring disk, which consists of PEEK, is not thermally overloaded, nor does it melt.

BRIEF DESCRIPTION OF THE DRAWINGS

FIG. 1a is a plan view of a ring-shaped seal part;

FIG. 1b is a side view of the seal part of FIG. 1a;

FIG. 1c is a plan view of a closure part;

FIG. 1d is a side view of the closure part of FIG. 1c;

FIG. 1e is a plan view of an assembled sealing ring disk;

FIG. 1f is a side view of the assembled sealing ring disk of FIG. 1e;

FIG. 1g a section through the seal part of FIG. 1a along the line A—A;

FIG. 1h a perspective view of the parts of a sealing ring disk;

FIG. 2b is a side view of the seal part of FIG. 2a;

FIG. 3a is a sealing ring disk with eccentric seal part and closure part;

FIG. 3b is a side view of the sealing ring disk of FIG. 3a;

FIG. 4a is a further embodiment of a seal part;

FIG. 4b is a side view of the seal part of FIG. 4a;

FIG. 4c is a plan view of a closure part;

FIG. 4d is a side view of the closure part of FIG. 4c;

FIG. 4e is an assembled sealing ring disk;

FIG. 4f is a side view of the sealing ring disk of FIG. 4e and

FIG. 1a and also FIG. 1h show a ring-shaped seal part 2 which has a sector-like cut-out 3 so that the seal part 2 has an opening at this position. The seal part 2 has a sealing surface 2a which is oriented towards the piston rod 4 and performs a sealing function. FIG. 1g shows a section along the line A—A and shows the L-shaped cross-section which the seal part 2 has in the present embodiment. The seal part 2 has a main part 2e which runs out at both ends into the end parts 2c, 2d. From the side view of FIG. 1b, it is evident that the two end parts 2c, 2d are made thinner than the main part 2e in the direction of a normal or perpendicular S to a plane passing through the seal part 2, or in the direction of motion of the piston rod 4. FIG. 1c shows a closure part 1 which has a main part 1e as well as end parts 1g adjoining it at both sides which are ring shaped. FIG. 1d shows a side view of the illustration in FIG. 1c of the closure part 1 with the closure part having a groove 1a in the peripheral direction for receiving a toroidal spring 13. Both the seal part 2 and the closure part 1 have resilient properties. FIG. 1e shows a sealing ring disk 12 assembled from the closure part 1 and the seal part 2. In the process, the closure part 1 was placed onto the seal part 2 in such a manner that the closure part 1 lies on the lower part 2f of the seal part 2 and that the closure part 1 surrounds the upper part 2g of the seal part in the form of a ring. The main part 1e covers the cut-out 3 of the seal part 2 and lies on the end parts 2c, 2d in the direction of the normal S. The sealing ring disk 12 thereby has a sealing function over the entire surface of the piston rod 4. The main part 1e as well as the seal part 2 have a clearance S1 in the peripheral direction of the seal part 2. The sealing ring disk 12 is advantageously surrounded by a toroidal spring or hose spring 13 so that the sealing ring disk 12 is under pretension. During the use of the sealing ring disk 12 as a seal element the movement of the piston rod 4 leads to wear of the sealing surface 2a, which results in the removal of material. The hose spring 13, the clearance S1 as well as the resilient properties of the sealing ring disk 12 ensure that the seal surface 2a can continue to lie on the surface of the piston rod 4. FIG. 1f shows a side view of the sealing ring disk of FIG. 1e.

FIG. 2a shows a further exemplary embodiment of a seal part 2 which has a main part 2e that runs out at both ends into the end parts 2c, 2d. The seal part 2 is again executed in a ring shape with a sector-like cut-out 3. Furthermore, the seal part 2 has a support surface 2h for supporting the closure part 1 on the side lying opposite to the cut-out 3. FIG. 2b shows a side view of the embodiment of a seal part in accordance with FIG. 2a. As in FIG. 1b the end parts 2c, 2d are also made thinner here than the main part 2e in the direction of the normal S. FIG. 2c shows a closure part 1 with a main part 1e. FIG. 2d shows a side view of the closure part in accordance with FIG. 2c with a recess 1a for the hose spring 13 extending at the outer surface in the peripheral direction of the closure part. The seal part 2 as well as the closure part 1 can be assembled to form a sealing ring disk 12 in a manner similar to that shown in FIG. 1e so that a seal results along the surface of the piston rod 4.

FIG. 3a shows a further exemplary embodiment of a sealing ring disk 12. The seal part 2 tapers in the radial direction towards the end part 2c, 2d. A seal part tapering in this manner has the advantage that the elastic properties behave approximately similarly in the peripheral direction. A seal part 2 executed in such a manner can be surrounded by a closure part as shown in FIG. 1c. In this case, the piston rod 4 would be arranged asymmetrically with respect to the periphery of the closure part 1. A further possibility is the embodiment of a closure part 1 shown in FIG. 3a, which likewise has tapering end parts 1g starting from the main part 1e, with the seal part 2 and the closure part 1 being mutually matched in such a manner that the seal part 2 has an axial formation 2i eccentric to the piston rod, and that the closure part 1 has an eccentric cut-out 1i complementary hereto in such a way that the piston rod 4 lies centrally with respect to the entire sealing ring disk 12. FIG. 3b shows a side view of the embodiment of a sealing ring disk 12 in accordance with FIG. 3a. FIG. 4a shows a further seal part 2 with a main part 2e which runs out at both ends into end parts 2c, 2d, with the end parts 2c, 2d again being shown thinner with respect to the main part 2e as shown in FIG. 4b. FIG. 4c shows a closure part 1 which, in the present embodiment, consists only of the main part 1e, which has a part if as shown in FIG. 4d. The closure part 1e can be inserted into the cut-out 3 of the seal part 2 as shown in FIG. 4e, with the closure part 1 being arranged opposite the seal part 2 extending in the peripheral direction of the seal part 2 and having a clearance S1 extending in this direction. FIG. 4f shows a side view of the embodiment in accordance with 4e. A recess 1a for receiving a hose spring 13 can be arranged along the peripheral direction of the seal part 2 as well as along the peripheral direction of the main part 1e. The sealing ring disk 12 is suitable, in particular, for a seal arrangement for a piston rod 4 with a circular cross-section, as shown in FIG. 5. At least one sealing chamber 14 which surrounds the piston rod 4 and is formed of two chamber rings 5 and is sealingly screwed to the associated cylinder space 15 belongs to the fundamental lay-out of a dry running seal arrangement or packing 6. It has a two-part sealing ring disk 12 which is surrounded by a hose spring 13 and has a closure part 1 as well as a seal part 2. The sealing ring disk 12 lies under bias tension with sealing surfaces 2a in contact with the piston rod 4.

Figure 2C:
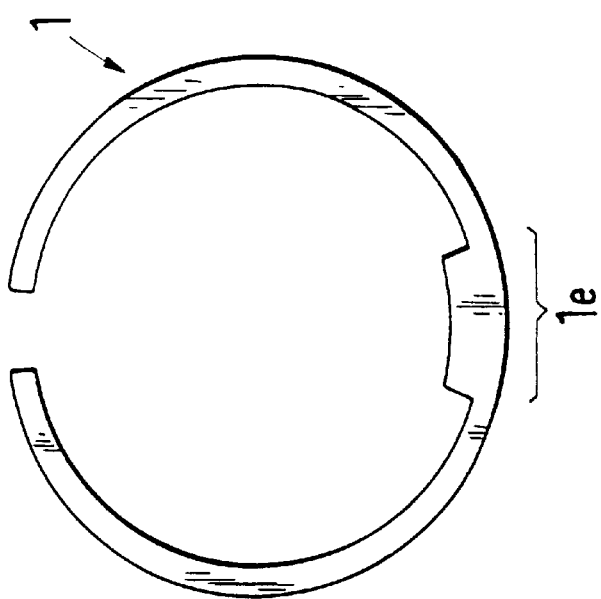
FIG. 2c a plan view of a closure part.
Figure 2D:
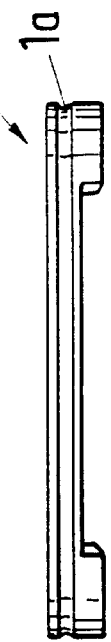
FIG. 2d is a side view of the closure part of FIG. 2c.
Figure 2A:
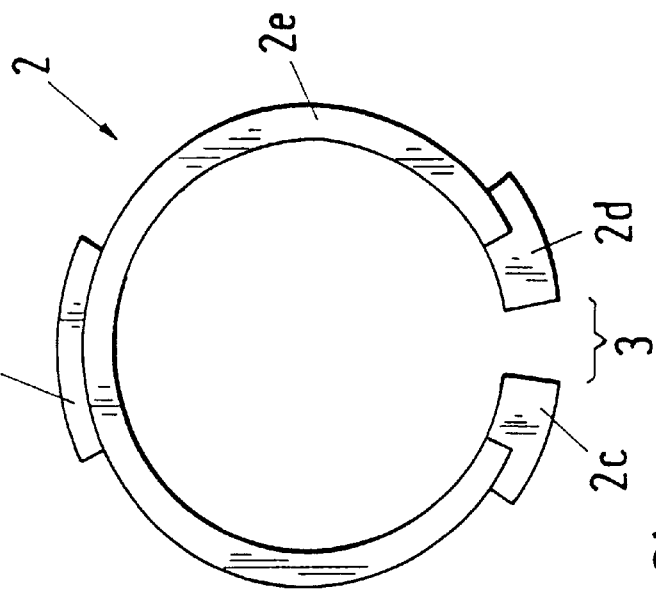
FIG. 2a is a plan view of a ring-shaped seal part.
Figure 2B:
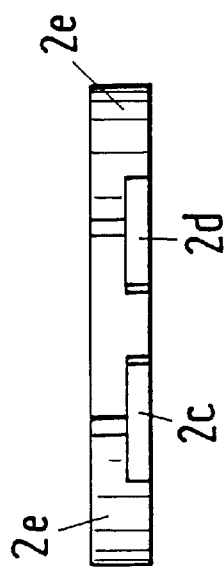
Figure 5:
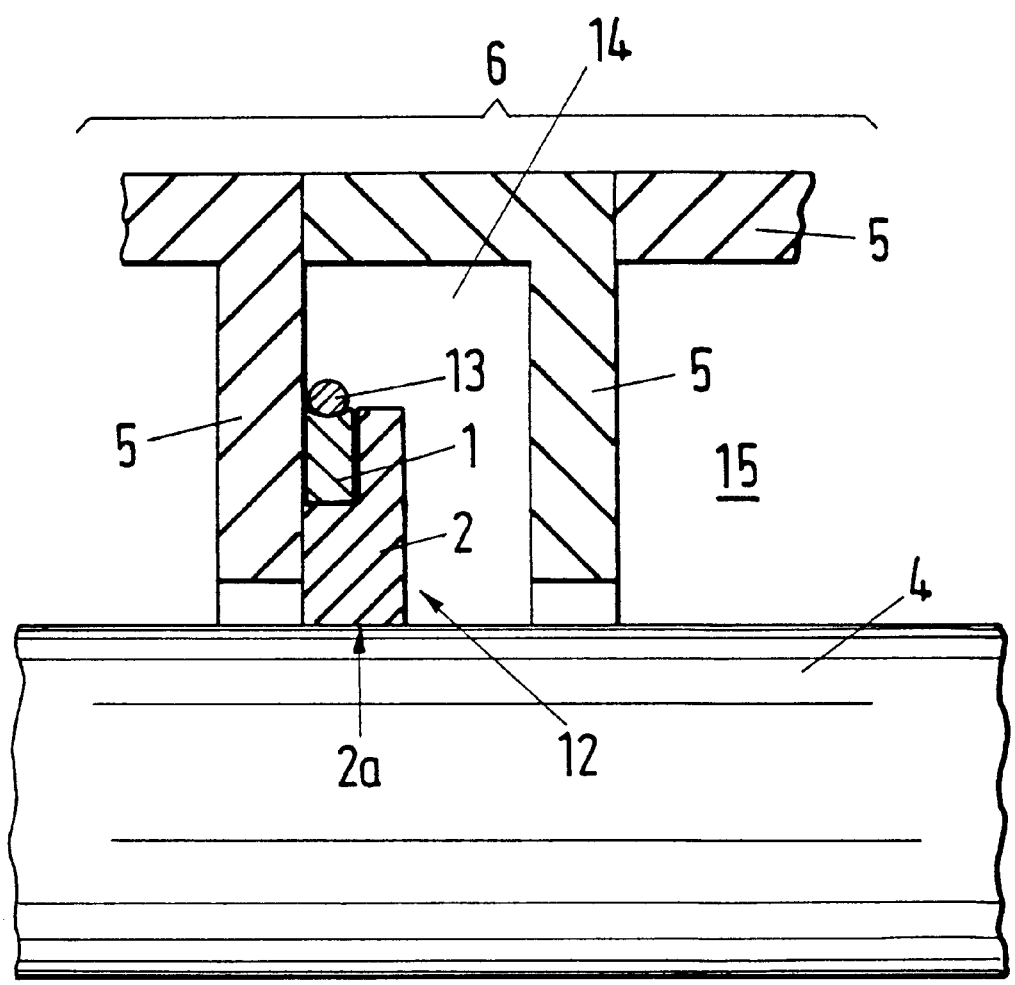
FIG. 5 is a radial section through a sealing ring disk in accordance with the invention in the installed state.

What is claimed is:

1. A sealing ring disk comprising:

a single ring-shaped seal part having a sector-like cut-out;

an inward-facing sealing surface; and a closure part having a main part with an inward-facing surface;

wherein said main part of the closure part is matched to the cut-out in such a manner that the main part extending in the peripheral direction of the seal part is insertable into the seal part such that the main part covers the cut-out in order to assemble the seal part and the closure part to a single sealing ring disk with a sealing surface consisting of the sealing surface of the seal part and the inward facing surface of the main part of the closure part.

2. A sealing ring disk in accordance with claim 1 wherein the main part lies partially on the seal part in a direction normal to a plane spanned by the seal part.

3. A sealing ring disk in accordance with claim 1 wherein the seal part has a primary part that terminates in two end parts, with the end parts being made thinner in the normal direction than the primary part; and wherein the main part lies on the end parts in the normal direction.

4. A sealing ring disk in accordance with claim 1 wherein the seal part has resilient properties; and wherein the main part and the seal part have a mutual clearance in the peripheral direction.

5. A sealing ring disk in accordance with claim 1 wherein the closure part has end parts going out from the main part at both ends; and wherein the end parts lie on the seal part partially encompassing it.

6. A sealing ring disk in accordance with claim 5 wherein the closure part has resilient properties.

7. A sealing ring disk in accordance with claim 1 wherein the seal part is executed in L-shape, with a broad side forming a sealing surface oriented toward the piston rod.

8. A sealing ring disk in accordance with claim 1 wherein the sealing ring disk has a metallic enclosure ring.

9. A sealing ring disk in accordance with claim 1 wherein the seal part has a thickness in the radial direction which decreases towards the sector-like cut-out.

10. A sealing ring disk in accordance with claim 1 wherein the seal part has an axial formation eccentric to the piston rod and wherein the closure part has an eccentric cut-out complementary thereto.

11. A sealing ring disk in accordance with claim 1 wherein at least one of the seal part and the closure part consists of one of a plastic, a modified high-temperature polymer or a modified epoxy resin.

12. A piston compressor that includes a sealing ring disk, the sealing ring disk comprising:

a single ring-shaped seal part having a sector-like cut-out;

an inward-facing sealing surface; and a closure part having a main part with an inward-facing surface;

wherein said main part of the closure part is matched to the cut-out in such a manner that the main part extending in the peripheral direction of the seal part is insertable into the seal part such that the main part covers the cut-out in order to assemble the seal part and the closure part to a single sealing ring disk with a sealing surface consisting of the sealing surface of the seal part and the inward facing surface of the main part of the closure part.

* * * * *